(12) United States Patent
Mansfield et al.

(10) Patent No.: US 6,487,507 B1
(45) Date of Patent: Nov. 26, 2002

(54) REMOTE SIGNAL CONDITIONER FOR A CORIOLIS FLOWMETER

(75) Inventors: William M. Mansfield, Lafayette, CO (US); Michael J. Zolock, Longmont, CO (US)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 09/419,346

(22) Filed: Oct. 15, 1999

(51) Int. Cl.[7] .................................................. G01N 9/00
(52) U.S. Cl. ............................ 702/45; 702/23; 702/38; 702/54; 702/57; 702/64; 702/115
(58) Field of Search .............................. 702/23, 38, 41, 702/45, 48, 50, 54, 56, 57, 64, 65, 100, 103, 105, 107, 115, 117, 118, 124, 126, 182–184, 190, 192, FOR 105, FOR 106, FOR 104, FOR 164, FOR 170; 700/280, 282; 73/861.354, 357, 861.18, 861.02, 861.03, 32 A, DIG. 1, 570, 592, 602, 650, 662–664, 667, 668; 324/207.11, 207.15–17, 257, 258, 600, 605, 909, 654, 727, 656; 361/78, 79, 86

(56) References Cited

U.S. PATENT DOCUMENTS

| | | | | |
|---|---|---|---|---|
| 4,123,940 A | * | 11/1978 | Herzl et al. | 73/194 VS |
| 4,260,949 A | * | 4/1981 | Dalton, Jr. | 324/302 |
| 4,491,892 A | * | 1/1985 | Lehmann et al. | 361/101 |
| 4,623,950 A | * | 11/1986 | Palara et al. | 361/79 |
| 4,839,769 A | * | 6/1989 | Soo et al. | 361/84 |
| 4,996,871 A | * | 3/1991 | Romano | 73/861.38 |
| 5,359,211 A | * | 10/1994 | Croft | 257/173 |
| 5,371,395 A | * | 12/1994 | Hawkins | 257/361 |
| 5,764,463 A | * | 6/1998 | Arvidson et al. | 361/31 |
| 5,790,392 A | * | 8/1998 | Eklund et al. | 363/49 |
| 5,895,988 A | * | 4/1999 | Shaffer et al. | 307/126 |
| 5,909,135 A | * | 6/1999 | Baldwin et al. | 327/328 |
| 5,926,383 A | * | 7/1999 | Pilukaitis et al. | 363/50 |
| 5,968,083 A | * | 10/1999 | Ciciarelli et al. | 607/62 |
| 6,226,195 B1 | * | 5/2001 | Mansfield | 363/98 |
| 6,260,004 B1 | * | 7/2001 | Hays et al. | 702/183 |
| 6,311,136 B1 | * | 10/2001 | Henry et al. | 702/45 |

FOREIGN PATENT DOCUMENTS

| | | |
|---|---|---|
| DE | 4323028 A1 | 1/1995 |
| EP | 0759541 A1 | 2/1997 |
| JP | 408126300 A * | 3/1996 |
| WO | WO0129519 A1 * | 4/2001 |

* cited by examiner

Primary Examiner—Marc S. Hoff
Assistant Examiner—Carol S. W. Tsai
(74) Attorney, Agent, or Firm—Faegre & Benson LLP (57) ABSTRACT

Meter electronics for a Coriolis flowmeter capable of being intrinsically safe. A signal conditioner receives power from a power supply in a host system remote from the signal conditioner. Drive circuitry in the signal conditioner generates a drive signal and applies the drive signal to a driver affixed to at least one conduit of the Coriolis flowmeter. Pick-off signal conditioning circuitry in the signal conditioner receives input signals from a first pick-off sensor and a second pick-off sensor affixed to the at least one conduit of the Coriolis flowmeter, generates information indicating properties of a material flowing through the conduit from the input signals, and transmits output signals containing the information to the host system. Host-side protection circuitry in the signal conditioner prevents power in excess of an intrinsically safe threshold from being applied to wires connecting the signal conditioner to the host system and flowmeter assembly protection circuitry in said signal conditioner prevents power in excess of the intrinsically safe threshold from being applied to wires connecting the signal conditioner to the driver, the first pick-off sensor, and the second pick-off sensor.

50 Claims, 3 Drawing Sheets

REMOTE SIGNAL CONDITIONER FOR A CORIOLIS FLOWMETER

FIELD OF THE INVENTION

This invention relates to meter electronics for a Coriolis flowmeter. More particularly, this invention relates to meter electronics that has a signal conditioner that is remote from a host system and is capable of being intrinsically safe. Still more particularly, this invention relates to meter electronics that have a signal conditioner that allows conventional 2 or 4 wire cable to be used to supply power to a Coriolis flowmeter.

Problem

It is known to use Coriolis effect mass flowmeters to measure mass flow and other information with respect to materials flowing through a pipeline as disclosed in U.S. Pat. No. 4,491,025 issued to J. E. Smith, et al. of Jan. 1, 1985 and U.S. Pat. No. Re. 31,450 to J. E. Smith of Feb. 11, 1982. These flowmeters have one or more flow tubes of a curved or a straight configuration. Each flow tube configuration in a Coriolis mass flowmeter has a set of natural vibration modes, which may be of a simple bending, torsional, radial, or coupled type. Each flow tube is driven to oscillate at resonance in one of these natural modes. The natural vibration modes of the vibrating, material filled systems are defined in part by the combined mass of the flow tubes and the material within the flow tubes. Material flows into the flowmeter from a connected pipeline on the inlet side of the flowmeter. The material is then directed through the flow tube or flow tubes and exits the flowmeter to a pipeline connected on the outlet side.

A driver applies a vibrational force to the flow tube. The force causes the flow tube to oscillate. When there is no material flowing through the flowmeter, all points along a flow tube oscillate with a substantially identical phase. As a material begins to flow through the flow tube, Coriolis accelerations cause each point along the flow tube to have a different phase with respect to other points along the flow tube. The phase on the inlet side of the flow tube lags the driver, while the phase on the outlet side leads the driver. Sensors at two different points on the flow tube produce sinusoidal signals representative of the motion of the flow tube at the two points. A phase difference of the two signals received from the sensors is calculated in units of time. The phase difference between the two sensor signals is proportional to the mass flow rate of the material flowing through the flow tube or flow tubes.

It is a problem that a 9-wire cable must be used to connect meter electronics to a flowmeter assembly. For purposes of the present discussion, meter electronics include all of the circuitry needed to produce drive signals and to process signals from the sensors and a flowmeter assembly includes at least one flow tube, an affixed driver, and sensors needed to measure the oscillation of the flow tube. The 9-wire cable for connecting the meter electronics to the flowmeter assembly includes two wires that connect the meter electronics to the driver, two wires that connect the meter electronics to a first pick-off, two wires that connect the meter electronics to a second pick-off, and three wires for connecting the meter electronics to a temperature sensor.

The 9-wire cable is a custom cable and is expensive to produce and is therefore expensive for a user of a Coriolis flowmeter to purchase. The expense of 9-wire cable is a particular problem when the user of a Coriolis flowmeter wishes to move the meter electronics to a control area remote from the flowmeter assembly. The 9-wire cable must be installed the entire length between the meter electronics and the flowmeter assembly. The cost of such 9-wire cable increases greatly as the distance between the meter electronics and the flowmeter assembly increases. It would be a particular advantage if conventional 2-wire or 4-wire cable that is relatively inexpensive and readily available to users could be used to connect the flowmeter assembly to the meter electronics.

A further problem in designing meter electronics is that the meter electronics may be used in an explosive environment containing a volatile material. For purposes of the present discussion, an explosive environment is a system that includes a volatile material which can be ignited if a spark, excessive heat, or excessive energy is introduced into the environment. One manner in which a meter electronics may operate in an explosion environment is to be enclosed in an explosion proof housing. An explosion proof housing is a housing that is designed to ensure that a spark or excessive heat from inside the housing does not ignite the volatile material in the environment outside the housing.

In order to make a device explosion proof, methods including encapsulation, pressurization, and flameproof containment may be used. Each of the above methods encloses a device to prevent the volatile material from contacting the device where heated surfaces of the device or sparks from circuitry in the device may cause an ignition of the material. If a material ignites inside an enclosure, any gaps or openings in the enclosure must provide a flame path of a sufficient length to cool the material as the material escapes from the enclosure. The cooling of the hot material prevents the hot material from igniting the volatile material outside the enclosure.

A second solution is to make the meter electronics intrinsically safe. An intrinsically safe device is a device in which all the circuitry in the device operates under a certain low energy level. By operating under a certain energy level, the device is ensured not to generate a spark or sufficient heat to cause an explosion even if the device fails in some manner. The power level needed to make a device intrinsically safe are determined by regulatory agencies such as UL in the United States, CENELEC in Europe, CSA in Canada, and TIIS in Japan.

Solution

The above and other problems are solved and an advance in the art is made by a signal conditioner in accordance with this invention. A first advantage of this invention is the 9-wire cable to a Coriolis flowmeter assembly may be eliminated even in flowmeters where a power supply may be remote from a Coriolis flowmeter assembly. A second advantage of this signal conditioner is that the entire meter electronics do not have to be enclosed in an explosion proof housing. Instead, a signal conditioner may be used that operates at a power level below the required energy and/or power threshold needed to be intrinsically safe. Therefore, the signal conditioner does not have to be enclosed in an explosion proof housing if the leads to and from the signal conditioner do not carry energy and/or power at a level above the threshold for being intrinsically safe.

The meter electronics of this invention eliminate the need for conventional 9-wire cable to connect a flowmeter assembly to the meter electronics in a Coriolis flowmeter. Instead, a conventional 2-wire or 4-wire cable can be used to supply energy and/or power to a signal conditioner from a host system. The signal conditioner can generate the drive signal, can receive sensors signals from motion and temperature sensors affixed to a flow tube, and can process the signals from the sensors to generate information about the properties of the material flowing through the flow tube.

The signal conditioner is connected to the driver and sensors by 9 separate leads that are distinct from the conventional 9-wire cable typically used to connect the meter electronics to the 9 separate leads. After processing the signals, the signal conditioner may transmit information relating to properties of the material over 2 separate wires in a conventional 4-wire cable or over the 2-wires supplying power in a conventional 2-wire cable.

In order to make the signal conditioner capable of being intrinsically safe, the signal conditioner includes host-side protection circuitry and flowmeter assembly protection circuitry. The host side protection circuitry prevents energy and/or power in excess of an intrinsically safe threshold from being applied by the signal conditioner to the leads connecting the signal conditioner to the host system. The intrinsically safe threshold is the level of energy and/or power dictated by various agencies to ensure that a spark or heat from the circuitry does not ignite volatile material in the environment. For purposes of brevity throughout the rest of this discussion, power is understood to mean energy and/or power.

The host-side protection circuitry may include power supply protection circuitry and/or signaling protection circuitry. The power barrier circuitry prevents power from flowing from the signal conditioner over the first wire and the second wire supplying power to the signal conditioner. The signaling protection circuitry prevents power in excess of the intrinsically safe threshold from being applied by the pick-off signal conditioning circuitry in the signal conditioner to the leads connecting the pick-off signal condition circuitry to the host system.

The flowmeter assembly barrier circuitry prevents power in excess of a intrinsically safe threshold from being applied to leads connected to the flowmeter assembly. The flowmeter assembly protection circuitry may include a drive signal protection circuitry and sensor signals protection circuitry. The drive protection circuitry prevents power in excess of the intrinsically threshold power from being applied to leads connected to the driver by the drive circuitry in the signal conditioner. The sensor signal protection circuitry prevents power from being applied to a lead connected the first pick-off and a lead connected to the second pick-off by the pick-off signal conditioning circuitry in the signal conditioner.

The host system includes the power supply and a secondary signal processing system. The power supply supplies power to the entire system and the secondary processing system receives output signals from the signal conditioner and determines properties of the material flowing through the flow tube. In order to be intrinsically safe, the host system may include a barrier that prevents power greater than the intrinsically safe threshold from being applied to leads connected to the signal conditioner by the host system.

The barrier may include power supply protection circuitry and secondary processing protection circuitry. The power supply protection circuitry prevents power in excess of the intrinsically safe threshold from being applied to the first wire and the second wire supplying power to the signal conditioner. The secondary signal protection circuitry prevents power from being applied by the secondary processing system to the leads connecting the secondary processing system to the pick-off signal condition circuitry in the signal conditioner.

An aspect of this invention is meter electronics for a Coriolis flowmeter capable of being intrinsically safe. The meter electronics may include the following components. A signal conditioner remote from a host system that receives power from a power supply in the host system via a first wire and a second wire. Drive circuitry in the signal conditioner generates a drive signal from the power received from the power supply and applies the drive signal to a driver affixed to at least one conduit. Pick-off signal conditioning circuitry in the signal conditioner receives input signals from a first pick-off sensor and a second pick-off sensor affixed to said at least one conduit, generates information indicating properties of a material flowing through the conduit from the input signals, and transmits output signals containing the information to the host system. Host-side protection circuitry in the signal conditioner prevents power in excess of an intrinsically safe threshold from being applied by circuitry in the signal conditioner to leads connecting the signal conditioner to the host system and flowmeter assembly protection circuitry in the signal conditioner prevents power in excess of the intrinsically safe threshold from being applied by circuitry in the signal conditioner to leads connecting the signal conditioner to the driver, the first pick-off sensor, and the second pick-off sensor.

Another aspect of this invention is meter electronics wherein the host-side protection circuitry includes power supply protection circuitry in the signal conditioner that prevents power in excess of the intrinsically safe threshold from being applied to the first wire and the second wire by circuitry in the signal conditioner.

Another aspect of this invention is meter electronics wherein said host-side protection circuitry includes signaling protection circuitry in the signal conditioner that prevents power in excess of the intrinsically safe threshold from being applied to leads connecting the pick-off signal conditioning circuitry to the host system.

Another aspect of this invention is meter electronics wherein the flowmeter assembly protection circuitry includes drive protection circuitry in the signal conditioner that prevents power in excess of the intrinsically safe threshold from being applied by the drive circuitry to leads connected to the driver.

Another aspect of this invention is meter electronics wherein the flowmeter assembly protection circuitry includes sensor protection circuitry that prevents power in excess of the intrinsically safe threshold from being applied by the pick-off signal conditioning circuitry to leads connecting the first pick-off sensor and the second pick-off sensor to the pick-off signal conditioning circuitry.

Another aspect of this invention is meter electronics wherein the signal conditioner is operating intrinsically safe.

Another aspect of this invention is meter electronics wherein the host system includes the power supply and a secondary signal processing system. The meter electronics further comprises a barrier in the host system that prevents power in excess of the intrinsically safe threshold from being applied by the host system to leads between the signal conditioner and the host processor.

Another aspect of this invention is meter electronics wherein the barrier includes power protection circuitry that prevents power in excess of the intrinsically safe threshold from being applied to the first wire and the second wire by the power supply.

Another aspect of this invention is meter electronics further comprising secondary processing protection circuitry that prevents power in excess of the intrinsically safe threshold from being applied by the secondary processing system to leads connecting the pick-off signal conditioning circuitry to the secondary processing system.

Another aspect of this invention is meter electronics wherein the output signals are applied to the first wire and the second wire by the pick-off signal conditioning circuitry.

Another aspect of this invention is meter electronics wherein the output signals are applied to a third wire and a fourth wire that are connected to the host system.

Another aspect of this invention is meter electronics wherein the drive circuitry controls the amount of current of the drive signal that is applied to the driver.

Another aspect of this invention is meter electronics wherein said drive circuitry controls the amount of voltage of said drive signal that is applied to said driver.

BRIEF DESCRIPTION OF THE DRAWINGS

The above and other advantages of this inventions are set forth in the Detailed Description and the following drawings.

DETAILED DESCRIPTION

Preferred embodiments of the present invention now will be described more fully hereinafter with reference to the accompanying drawings. Those skilled in the art will appreciate that the invention may be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

Figure 1:
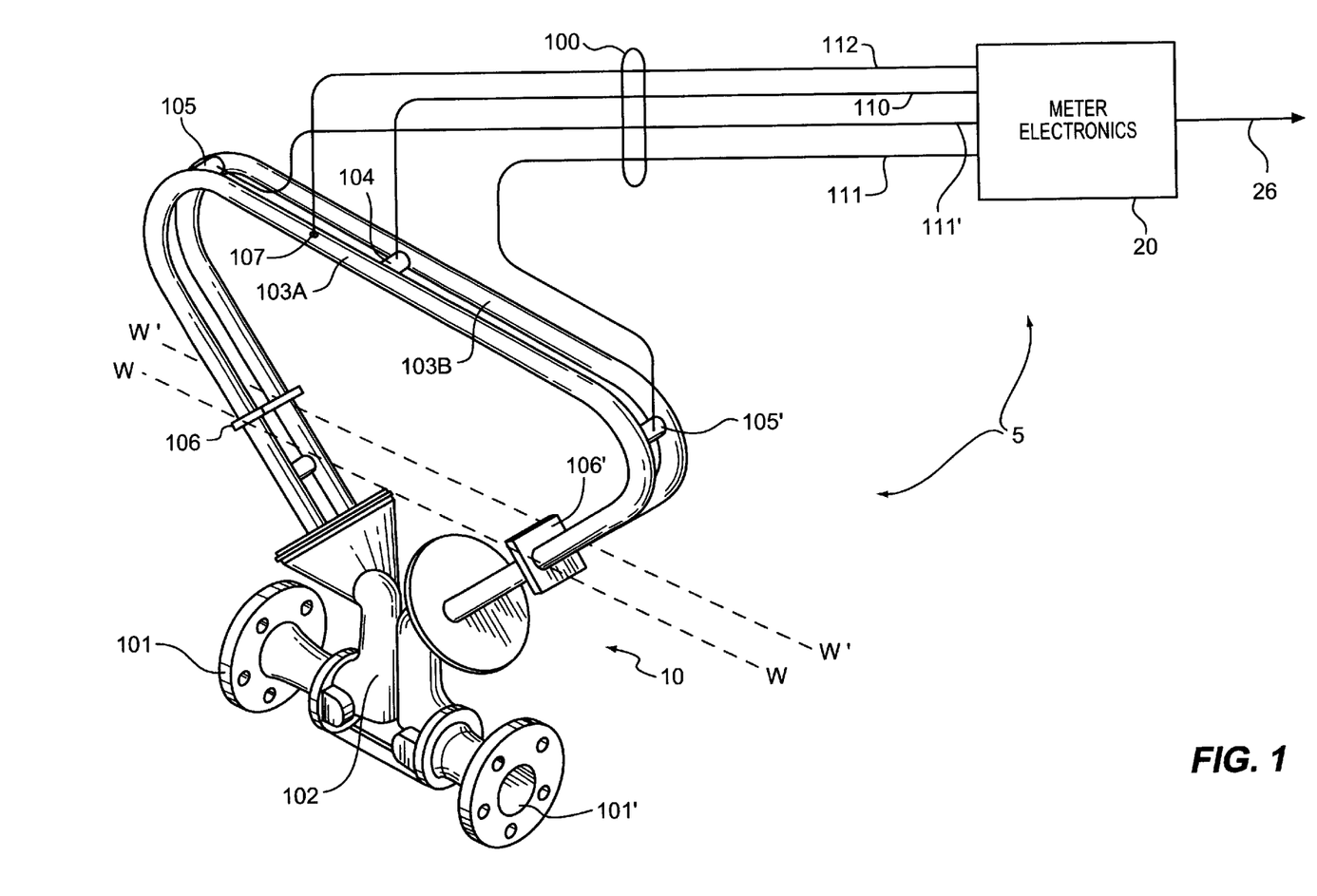
FIG. 1 illustrating a Coriolis flowmeter that incorporates the meter electronics in accordance with this invention.

FIG. 1 shows an exemplary Coriolis flowmeter 5 comprising a Coriolis flowmeter assembly 10 and meter electronics 20. Meter electronics 20 is connected to flowmeter assembly 10 via path 100 to provide for example, but not limited to, density, mass flow rate, volume flow rate and totalized mass flow information over path 26. A Coriolis flowmeter structure is described although it should be apparent to those skilled in the art that the present invention could be practiced in conjunction with any apparatus having a vibrating conduit to measure properties of material flowing through the conduit. A second example of such an apparatus is a vibrating tube densitometer which does not have the additional measurement capability provided by a Coriolis mass flowmeters.

Meter assembly 10 includes a pair of flanges 101 and 101', manifold 102 and conduits 103A and 103B. Connected to conduits 103A and 103B are driver 104, pick-off sensors 105 and 105', and temperature sensor 107. Brace bars 106 and 106' serve to define the axis W and W' about which each conduit oscillates.

When Coriolis flowmeter 5 is inserted into a pipeline system (not shown) which carries the process material that is being measured, material enters flowmeter assembly 10 through flange 101, passes through manifold 102 where the material is directed to enter conduits 103A and 103B, flows through conduits 103A and 103B and back into manifold 102 from where it exits meter assembly 10 through flange 101'.

Conduits 103A and 103B are selected and appropriately mounted to the manifold 102 so as to have substantially the same mass distribution, moments of inertia and elastic modules about bending axes W—W and W'—W', respectively. The conduits 103A–103B extend outwardly from the manifold in an essentially parallel fashion.

Conduits 103A–103B are driven by driver 104 in opposite directions about their respective bending axes W and W' and at what is termed the first out of phase bending mode of the flowmeter. Driver 104 may comprise any one of many well known arrangements, such as a magnet mounted to conduit 103A and an opposing coil mounted to conduit 103B and through which an alternating current is passed for vibrating both conduits. A suitable drive signal is applied by meter electronics 20 to driver 104 via path 110.

Pick-off sensors 105 and 105' are affixed to at least one of conduits 103A and 103B on opposing ends of the conduit to measure oscillation of the conduits. As the conduit 103A–103B vibrates, pick-off sensors 105–105' generate a first pick-off signal and a second pick-off signal. The first and second pick-off signals are applied to paths 111 and 111' prime. The driver velocity signal is applied to path 110.

Temperature sensor 107 is affixed to at least one conduit 103A and/or 103B. Temperature sensor 107 measures the temperature of the conduit in order to modify equations for the temperature of the system. Path 112 carries temperature signals from temperature sensor 107 to meter electronics 20.

Meter electronics 20 receives the first and second pick-off signals appearing on paths 111' and 111", respectively. Meter electronics 20 processes the first and second velocity signals to compute the mass flow rate, the density, or other property of the material passing through flowmeter assembly 10. This computed information is applied by meter electronics 20 over path 26 to a utilization means (not shown).

It is known to those skilled in the art that Coriolis flowmeter 5 is quite similar in structure to a vibrating tube densitometer. Vibrating tube densitometers also utilize a vibrating tube through which fluid flows or, in the case of a sample-type densitometer, within which fluid is held. Vibrating tube densitometers also employ a drive system for exciting the conduit to vibrate. Vibrating tube densitometers typically utilize only single feedback signal since a density measurement requires only the measurement of frequency and a phase measurement is not necessary. The descriptions of the present invention herein apply equally to vibrating tube densitometers.

Figure 2:
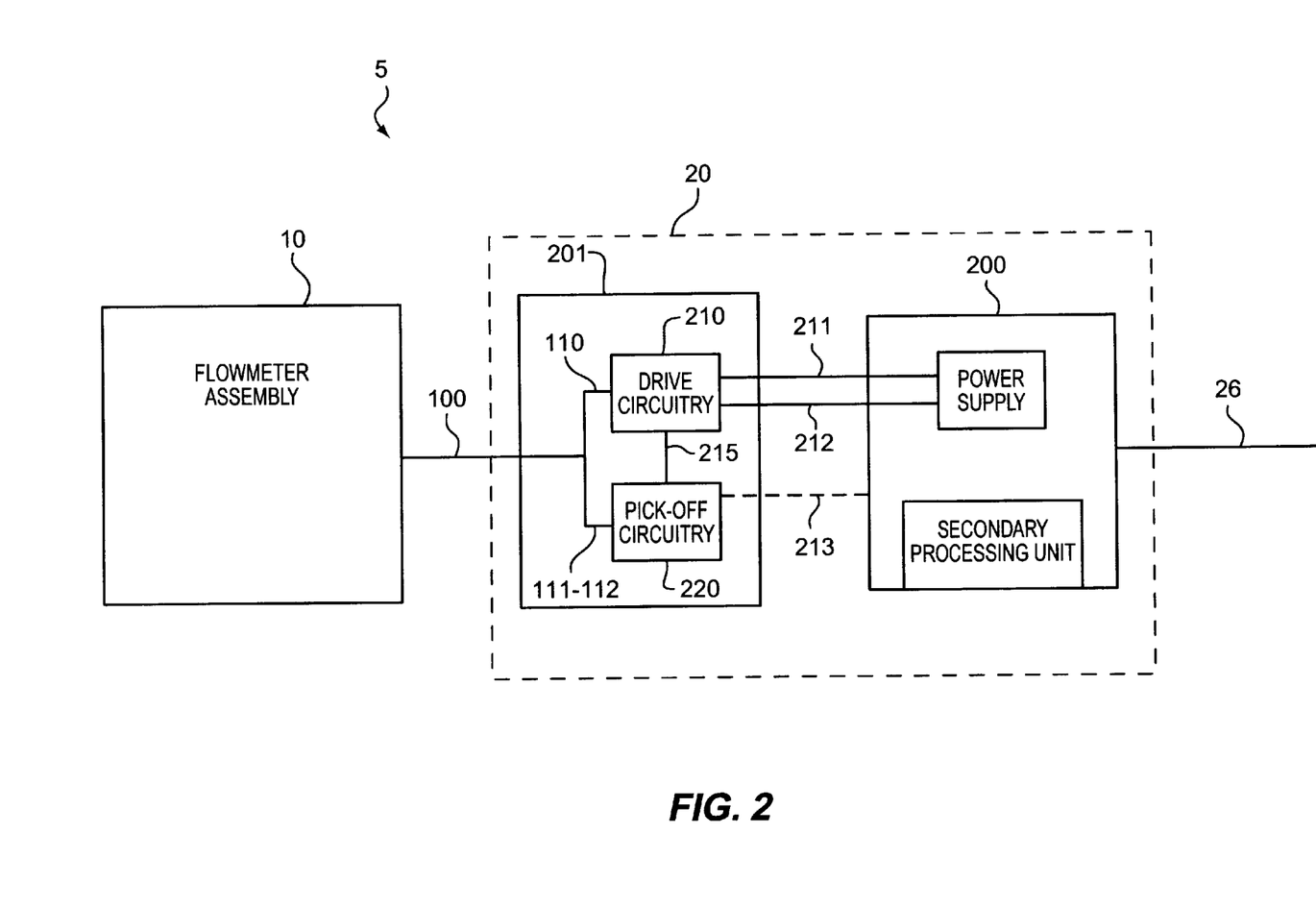
FIG. 2 illustrating a block diagram of the meter electronics in accordance with this invention.

FIG. 2 illustrates a preferred embodiment of the present invention in block diagram form. In this embodiment, the meter electronics 20 are physically divided into 2 components a host system 200 and a signal conditioner 201. In conventional meter electronics, these components are housed in one unit. This makes it necessary to run a 9-wire cable from the meter electronics 20 to the flow meter assembly 10. However, the separation of components of meter electronics 20 in this embodiment into a host system 200 and a signal conditioner 201 can eliminate the need for 9-wire cable apply signal from meter electronics 20 the leads connected to driver 104, to pick-off sensors 105–105', and to temperature sensor 107. (All shown in FIG. 1). Instead, signal conditioner 201 may be connected directly to the 9 leads in paths 110, 111–111', and 112 by juxtapositioning signal conditioner 201 to flowmeter assembly 10.

Signal conditioner 201 includes drive circuitry 210 and pick-off conditioning circuitry 220. Signal conditioner 201 is capable of being intrinsically safe. As such, all circuitry in signal conditioner 201 must perform at a power level that is below an intrinsically safe threshold. For purposes of this discussion, power means energy/and or power. The intrinsically safe threshold is the maximum power at which a device may operate in order to assure that a spark, excessive energy, or excessive heat from the circuit will not ignite volatile material in an environment. One skilled in the art will recognize that in actuality drive circuitry 210 and pick-off conditioning circuitry 220 may be separate analog circuits or may be separate functions provided by a digital signal processor or other digital components.

Drive circuitry 210 generates a drive signal and applies the drive signal to driver 104 via path 110 of path 100 (See FIG. 1). In actuality, path 110 is a first and a second lead. Drive circuitry 210 is communicatively connected to pick-off signal conditioning circuitry via path 215. Path 215 allows drive circuitry to monitor the incoming pick-off signals to adjust the drive signal. Power to operate drive circuitry 210 and pick-off signal conditioning circuitry 220 is supplied from host system 200 via a first wire 211 and a second wire 212. First wire 211 and second wire 212 may be a part of a conventional 2-wire or 4-wire cable.

Pick-off signal conditioning circuitry 220 receives input signals from first pick-off 105, second pick-off 105', and temperature sensor 107 via paths 111, 111' and 112 (See FIG. 1). Pick-off circuitry 220 determines the frequency of the pick-off signals and may also determine properties of a material flowing through conduits 103A–103B (See FIG. 1). After the frequency of the input signals from pick-off sensors 105–105' and properties of the material are determined, output signals carrying this information are generated and transmitted to a secondary processing unit 250 in host system 200 via path 221. In a preferred embodiment, path 221 includes 2 leads. However, one skilled in the art will recognize that path 221 may be carried over first wire 211 and second wire 212 or over any other greater number of wires.

Host system 200 includes a power supply 230 and secondary processing system 250. Power supply 230 receives electricity from a source and converts the received electricity to the proper power needed by the system. Secondary processing system 250 receives the output signals from pick-off signal conditioning circuitry 220 and then may perform processes needed to provide a properties of the material flowing through conduits 103A–103B needed by a user. Such properties may include but are not limited to density, mass flow rate, and volumetric flow rate.

Figure 3:
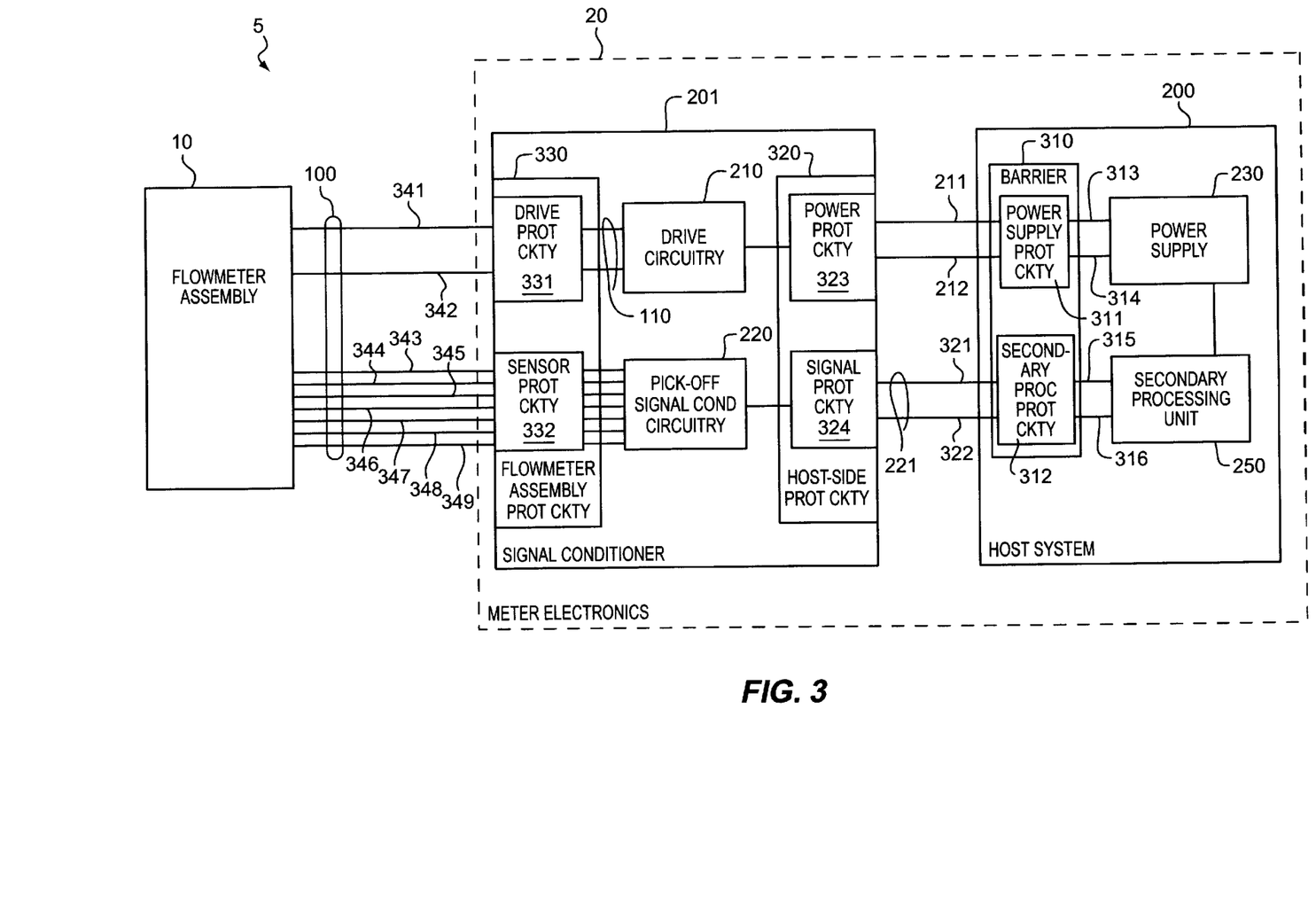
FIG. 3 illustrating a block diagram of the meter electronics of a preferred embodiment in accordance with this invention.

FIG. 3 illustrates a block diagram of an embodiment in accordance with the present invention that is intrinsically safe. This embodiment allows signal conditioner 201 to capable of being intrinsically safe. Therefore, signal conditioner 201 does not have to be housed in an explosion proof housing. Instead, only the components of host system 200 have to be housed in explosion proof housing in an explosive environment.

In order for the signal conditioner 201 to be capable of being intrinsically safe, drive circuitry 210 and pick-off signal conditioning circuitry 220 must operate at a power below an intrinsically safe threshold which is the maximum power that the various agencies allow deices to operate to ensure that a spark or heat from the circuitry does not ignite volatile material in the environment. In this embodiment, drive control circuitry 210 receives power from power supply 230 via path 328 and applies the drive signal to driver 104 via leads 341–342 of path 110 in path 100 (Also See FIG. 1).

Pick-off signal conditioning circuitry 220 receives signals from the pick-off sensors 105–105' (Shown in FIG. 1), and temperature sensor 107 via leads 343–349 that extend through the flowmeter assembly barrier circuitry 330 as described below. The output signals are then applied to leads 321–322 of path 221. The two leads are needed to support the conventional 4–20 ma or RS405 protocol. However, those skilled in the are will recognize that it is possible to apply the output signals to leads 211–212 over which power is received from host system 200.

Signal conditioner 201 also includes host-side protection circuitry 320 which prevents power in excess of an intrinsically safe threshold from being applied by signal conditioner 201 to leads connecting signal conditioner 201 to host system 200 and flowmeter assembly protection circuitry 330 that prevents power in excess of the intrinsically safe threshold from being applied by signal conditioner 201 to leads 341–349 connecting signal conditioner 201 flowmeter assembly 10. The intrinsically safe threshold is the maximum amount of power that the various agencies permit a device to operate and to be rated as intrinsically safe. The power can be measured either by the amount of current or voltage across the leads.

The host-side protection circuitry 320 includes power protection circuitry 323 and signaling protection circuitry 324. Power protection circuitry 323 receives power via first wire 211 and second wire 212 and ensures that power is not applied by signal conditioner 201 over wires 211–212 during operation or when a short occurs. Signaling protection circuitry 324 ensures that power in excess of the intrinsically safe threshold is not applied by the signal conditioner 201 to leads 321–322.

Flowmeter assembly protection circuitry 330 includes drive protection circuitry 331 and sensor protection circuitry 332. Drive protection circuitry 331 prevents power in excess of the intrinsically threshold from being applied by drive circuitry 210 to leads 341 and 342 that are connected to driver 104 (Shown in FIG. 1). Sensor protection circuitry 332 prevents power in excess of the intrinsically safe threshold from being applied by pick-off signal conditioning circuitry 220 to leads 343–349 during operation or when a short occurs.

Power supply protection circuitry 311 receives power from power supply 230 via paths 313–314 and includes circuitry that prevents power being applied to leads 211–212 from passing an intrinsically safe threshold either during normal operation or when a short occurs. The amount of power may be measured in the amount of current or the amount of voltage over the leads 211–212.

Secondary processing protection circuitry 312 receives signals from signal conditioning circuitry 220 via leads 321–322 in path 221 and transmits the output signals to secondary processor 250 via leads 315–316. Secondary processing barrier circuitry 312 prevents power in excess of the intrinsically safe threshold from being applied to leads 321–322 of path 221 during normal operation or when a short occurs.

This above describes meter electronics for a Coriolis flowmeter having a signal conditioner that is capable of being intrinsically safe and eliminates the need for conventional of 9-wire cable. It is expected that those skilled in the art may design other meter electronics that infringes the above described invention either literally or through the Doctrine of Equivalents.

What is claimed is:

1. Meter electronics for a Coriolis flowmeter capable of being intrinsically safe, said meter electronics comprising:

a signal conditioner that receives power from a power supply in a host system remote from said signal conditioner via a first wire and a second wire;

drive circuitry in said signal conditioner that generates a drive signal from said power received from said power supply and applies said drive signal to a driver affixed to at least one conduit;

pick-off signal conditioning circuitry in said signal conditioner that receives input signals from a first pick-off sensor and a second pick-off sensor affixed to said at least one conduit, generates information indicating properties of a material flowing through said conduit from said input signals, and transmits output signals containing said information to said host system;

host-side protection circuitry in said signal conditioner that prevents power in excess of an intrinsically safe threshold from being applied by circuitry in said signal conditioner to wires connecting said signal conditioner to said host system; and flowmeter assembly protection circuitry in said signal conditioner that prevents power in excess of said intrinsically safe threshold from being applied by circuitry in said signal conditioner to wires connecting said signal conditioner to said driver, said first pick-off sensor, and said second pick-off sensor.

2. The meter electronics of claim 1 wherein said host-side protection circuitry comprises:

power supply protection circuitry in said signal conditioner that prevents power in excess of said intrinsically safe threshold from being applied to said first wire and said second wire by said circuitry in said signal conditioner.

3. The meter electronics of claim 1 wherein said host-side protection circuitry comprises:

signaling protection circuitry in said signal conditioner that prevents power in excess of said intrinsically safe threshold from being applied to wires connecting said pick-off signal conditioning circuitry to said host system.

4. The meter electronics of claim 1 wherein said flowmeter assembly protection circuitry further comprises:

drive protection circuitry in said signal conditioner that prevents power in excess of said intrinsically safe threshold from being applied by said drive circuitry to wires connected to said driver.

5. The meter electronics of claim 1 wherein said flowmeter assembly protection circuitry further comprises:

sensor protection circuitry that prevents power in excess of said intrinsically safe threshold from being applied by said pick-off signal conditioning circuitry to wires connecting said first pick-off sensor and said second pick-off sensor to said pick-off signal conditioning circuitry.

6. The meter electronics of claim 1 wherein said signal conditioner is operating intrinsically safe.

7. The meter electronics of claim 6 wherein said host system includes said power supply and a secondary signal processing system, said meter electronics further comprising:

a barrier in said host system that prevents power in excess of said intrinsically safe threshold from being applied by said host system to said wires between said signal conditioner and said host processor.

8. The meter electronics of claim 7 wherein said barrier comprises:

power protection circuitry that prevents power in excess of said intrinsically safe threshold from being applied to said first wire and said second wire by said power supply.

9. The meter electronics of claim 8, further comprising a secondary processing protection circuitry that prevents power in excess of said intrinsically safe threshold from being applied by said secondary processing system to wires connecting said pick-off signal conditioning circuitry to said secondary processing system.

10. The meter electronics of claim 1 wherein said output signals are applied to said first wire and said second wire by said pick-off signal conditioning circuitry.

11. The meter electronics of claim 1 where said output signals are applied to a third wire and a fourth wire that are connected to said host system.

12. The meter electronics of claim 1 wherein said drive circuitry controls the amount of current of said drive signal that is applied to said driver.

13. The meter electronics of claim 1 wherein said drive circuitry controls the amount of voltage of said drive signal that is applied to said driver.

14. A method capable of being intrinsically safe for processing signals for a Coriolis flowmeter comprising the steps of:

receiving power in a signal conditioner from a power supply in a host system remote from said signal conditioner via a first wire and a second wire;

preventing power in excess of said intrinsically safe threshold from being applied to said first wire and said second wire by circuitry in said signal conditioner;

generating a drive signal from said power received from said power supply using drive circuitry in said signal conditioner;

applying said drive signal from said drive circuitry to a driver affixed to at least one conduit;

preventing power in excess of said intrinsically safe threshold from being applied by said drive circuitry to wires connected to said driver;

receiving input signals in pick-off signal conditioning circuitry in said signal conditioner from a first pick-off sensor and a second pick-off sensor affixed to said at least one conduit;

preventing power in excess of said intrinsically safe threshold from being applied by said pick-off signal conditioning circuitry to wires connecting said first pick-off sensor and said second pick-off sensor to said pick-off signal conditioning circuitry;

generating information indicating properties of a material flowing through said conduit from said input signals;

transmitting output signals containing said information to said host system; and preventing power in excess of said intrinsically safe threshold from being applied to wires connecting said pick-off signal conditioning circuitry to said host system.

15. The method of claim 14 wherein said signal conditioner is operating intrinsically safe.

16. The method of claim 14 wherein said host system includes said power supply and a secondary signal processing system, said method further comprising the step of:

preventing power in excess of said intrinsically safe threshold from being applied by said host system to said wires between said signal conditioner and said host processor.

17. The method of claim 16 wherein said step of preventing power from said host system comprises the step of:

preventing power in excess of said intrinsically safe threshold from being applied to said first wire and said second wire by said power supply.

18. The method of claim 16 wherein said step of preventing power from said host system comprises the step of:
preventing power in excess of said intrinsically safe threshold from being applied by said secondary processing system to wires connecting said pick-off signal conditioning circuitry to said secondary processing system.

19. The method of claim 14 wherein step of transmitting said output signals comprises the step of:
applying to said first wire and said second wire by said pick-off signal conditioning circuitry.

20. The method of claim 14 wherein said step of transmitting said output signals further comprises the step of:
applying said output signals to a third wire and a fourth wire that are connected to said host system.

21. The method of claim 14 further comprising the step of:
controlling the amount of current of said drive signal that is applied to said driver.

22. The method of claim 14 further comprising the step of:
controlling the amount of voltage of said drive signal that is applied to said driver.

23. A Coriolis flowmeter signal processor comprising:
an intrinsically safe signal conditioner for mounting proximate to and coupling with a flowmeter assembly, wherein said intrinsically safe signal conditioner is capable of producing output signals indicating properties of a material flowing through said flowmeter assembly from input signals generated by said flowmeter assembly when said material flows therein; and
a host system remote from and coupled to said intrinsically safe signal conditioner for providing power to said intrinsically safe signal conditioner,
the intrinsically safe signal conditioner comprising:
drive circuitry for generating a drive signal from said power received from a power supply in said host system and for applying said drive signal to a driver affixed to at least one conduit in said flowmeter assembly,
pick-off signal conditioning circuitry for receiving said input signals from a first pick-off sensor and a second pick-off sensor affixed to said at least one conduit, for generating information indicating said properties of said material flowing through said at least one conduit from said input signals, and for transmitting said output signals containing said information to said host system;
host-side protection circuitry for preventing power in excess of an intrinsically safe threshold from being applied by said intrinsically safe signal conditioner to wires connecting said intrinsically safe signal conditioner to said host system, and
flowmeter assembly protection circuitry for preventing power in excess of said intrinsically safe threshold from being applied by said intrinsically safe signal conditioner to wires connecting said signal conditioner to said driver, said first pick-off sensor, and said second pick-off sensor.

24. The Coriolis flowmeter signal processor of claim 23 wherein said host-side protection circuitry comprises:
power supply protection circuitry for preventing power in excess of said intrinsically safe threshold from being applied to wires connecting said intrinsically safe signal conditioner to said power supply in said host system.

25. The Coriolis flowmeter signal processor of claim 23 wherein said host-side protection circuitry comprises:
signaling protection circuitry for preventing power in excess of said intrinsically safe threshold from being applied to wires connecting said pick-off signal conditioning circuitry to said host system.

26. The Coriolis flowmeter signal processor of claim 23 wherein said flowmeter assembly protection circuitry further comprises:
drive protection circuitry for preventing power in excess of said intrinsically safe threshold from being applied by said drive circuitry to wires connected to said driver.

27. The Coriolis flowmeter signal processor of claim 23 wherein said flowmeter assembly protection circuitry further comprises:
sensor protection circuitry for preventing power in excess of said intrinsically safe threshold from being applied by said pick-off signal conditioning circuitry to wires connecting said first pick-off sensor and said second pick-off sensor to said pick-off signal conditioning circuitry.

28. The Coriolis flowmeter signal processor of claim 23 wherein said host system includes said power supply and further comprising:
a barrier for preventing power in excess of said intrinsically safe threshold from being applied by said host system to wires between said signal conditioner and said host processor.

29. The Coriolis flowmeter signal processor of claim 28 wherein said barrier comprises:
power protection circuitry that prevents power in excess of said intrinsically safe threshold from being applied to wires between said signal conditioner and said power supply in said host processor.

30. The Coriolis flowmeter signal processor of claim 29 further comprising:
a secondary processing protection circuitry for preventing power in excess of said intrinsically safe threshold from being applied by secondary processing system to wires connecting said pick-off signal conditioning circuitry to said secondary processing system.

31. The Coriolis flowmeter signal processor of claim 23 wherein said pick-off signal conditioning circuitry applies said output signals to wires connecting said pick-off signal conditioning circuitry and said host system.

32. The Coriolis flowmeter signal processor of claim 23 wherein said drive circuitry controls the amount of current of said drive signal that is applied to said driver.

33. The Coriolis flowmeter signal processor of claim 23 wherein said drive circuitry controls the amount of voltage of said drive signal that is applied to said driver.

34. A Coriolis flowmeter comprising:
a flowmeter assembly for generating sensor signals containing information associated with a material flowing through said flowmeter assembly;
an intrinsically safe signal conditioner mounted proximate to and coupled with said flowmeter assembly for receiving said sensor signals and for producing output signals indicating properties of said flowing material from said sensor signals; and
a host system remote from and coupled to said intrinsically safe signal conditioner for providing power to said intrinsically safe signal conditioner,
said intrinsically safe signal conditioner comprising:
drive circuitry that generates a drive signal from said power received from said host system and applies said drive signal to said flowmeter assembly,
pick-off signal conditioning circuitry that receives said sensor signals from said flowmeter assembly, generates information indicating properties of a material flowing through said flowmeter assembly, and transmits said output signals containing said information to said host system, host-side protection circuitry that prevents power in excess of an intrinsically safe threshold from being applied by said intrinsically safe signal conditioner to wires connecting said signal conditioner to said host system, and flowmeter assembly protection circuitry that prevents power in excess of said intrinsically safe threshold from being applied by said intrinsically safe signal conditioner to wires connecting said signal conditioner to said flowmeter assembly.

35. The Coriolis flowmeter of claim 34 wherein said host-side protection circuitry comprises:

power supply protection circuitry that prevents power in excess of said intrinsically safe threshold from being applied to wires connecting said host system to said intrinsically safe signal conditioner.

36. The Coriolis flowmeter of claim 34 wherein said host-side protection circuitry comprises:

signaling protection circuitry that prevents power in excess of said intrinsically safe threshold from being applied to wires connecting said pick-off signal conditioning circuitry to said host system.

37. The Coriolis flowmeter of claim 34 wherein said flowmeter assembly protection circuitry further comprises:

drive protection circuitry that prevents power in excess of said intrinsically safe threshold from being applied by said drive circuitry to wires connected to said flowmeter assembly.

38. The Coriolis flowmeter of claim 34 wherein said flowmeter assembly protection circuitry further comprises:

sensor protection circuitry that prevents power in excess of said intrinsically safe threshold from being applied by said pick-off signal conditioning circuitry to said wires connecting said pick-off signal conditioning circuitry to said flowmeter assembly.

39. The Coriolis flowmeter of claim 34 wherein said host system comprises:

a power supply;

a secondary signal processing system; and a barrier that prevents power in excess of said intrinsically safe threshold from being applied by said host system to said wires between said signal conditioner and said host system.

40. The Coriolis flowmeter of claim 39 wherein said barrier comprises:

power protection circuitry that prevents power in excess of said intrinsically safe threshold from being applied to wires connecting said power supply to said signal conditioner.

41. The Coriolis flowmeter of claim 40 further comprising:

a secondary processing protection circuitry that prevents power in excess of said intrinsically safe threshold from being applied by said secondary signal processing system to wires connecting said pick-off signal conditioning circuitry to said secondary processing system.

42. The Coriolis flowmeter of claim 34 wherein said output signals are applied to wires connecting said pick-off signal conditioning circuitry to said host system.

43. The Coriolis flowmeter of claim 34 wherein said drive circuitry controls the amount of current of said drive signal that is applied to said flowmeter assembly.

44. The Coriolis flowmeter of claim 34 wherein said drive circuitry controls the amount of voltage of said drive signal that is applied to said flowmeter assembly.

45. A flowmeter signal processing system, comprising:

a signal conditioner;

a host system remotely coupled to said signal conditioner;

wherein said signal conditioner and said host system operate withing an intrinsically safe threshold, and wherein said signal conditioner comprises flowmeter assembly protection circuitry coupled to a flowmeter assembly and host-side protection circuitry coupled to said host system.

46. The flowmeter signal processing system of claim 45 wherein said flowmeter assembly protection circuitry comprises drive protection circuitry.

47. The flowmeter signal processing system of claims 45 or 46 wherein said flowmeter assembly protection circuitry comprises sensor protection circuitry.

48. The flowmeter signal processing system of claim 45 wherein said host system comprises a barrier.

49. The flowmeter signal processing system of claim 48, wherein said barrier comprises power supply protection circuitry coupled to said signal conditioner.

50. The flowmeter signal processing system of claims 48 or 49 wherein said barrier comprises processing protection circuitry coupled to said signal conditioner.

* * * * *

UNITED STATES PATENT AND TRADEMARK OFFICE
CERTIFICATE OF CORRECTION

PATENT NO.   : 6,487,507 B1
DATED        : November 26, 2002
INVENTOR(S)  : Mansfield, William M. and Zolock, Michael J.

It is certified that error appears in the above-identified patent and that said Letters Patent is hereby corrected as shown below:

Column 8,
Line 43, insert the following,

In order to make the system intrinsically safe, host system 200 cannot apply power over the intrinsically safe threshold to leads connected to signal conditioner 201. Barrier 310 in host system 200 prevents power in excess of an intrinsically safe threshold from being applied to leads 211-212 and 321-322 connecting host system 200 to signal conditioner 201. Barrier 310 includes power supply protection circuitry 311 and secondary processing protection circuitry 312.

Lines 61-64, replace "tional of 9-wire cable. It is expected that those skilled in the art may design other meter electronics that infringes the above described invention either literally or through the Doctrine of Equivalents." with -- tional 9-wire cables. --

Column 14,
Line 28, replace "operate withing an intrinsically safe threshold, and" with -- operate within an intrinsically safe threshold, and --

Signed and Sealed this

Eighteenth Day of November, 2003

JAMES E. ROGAN
*Director of the United States Patent and Trademark Office*